Patented May 31, 1927.

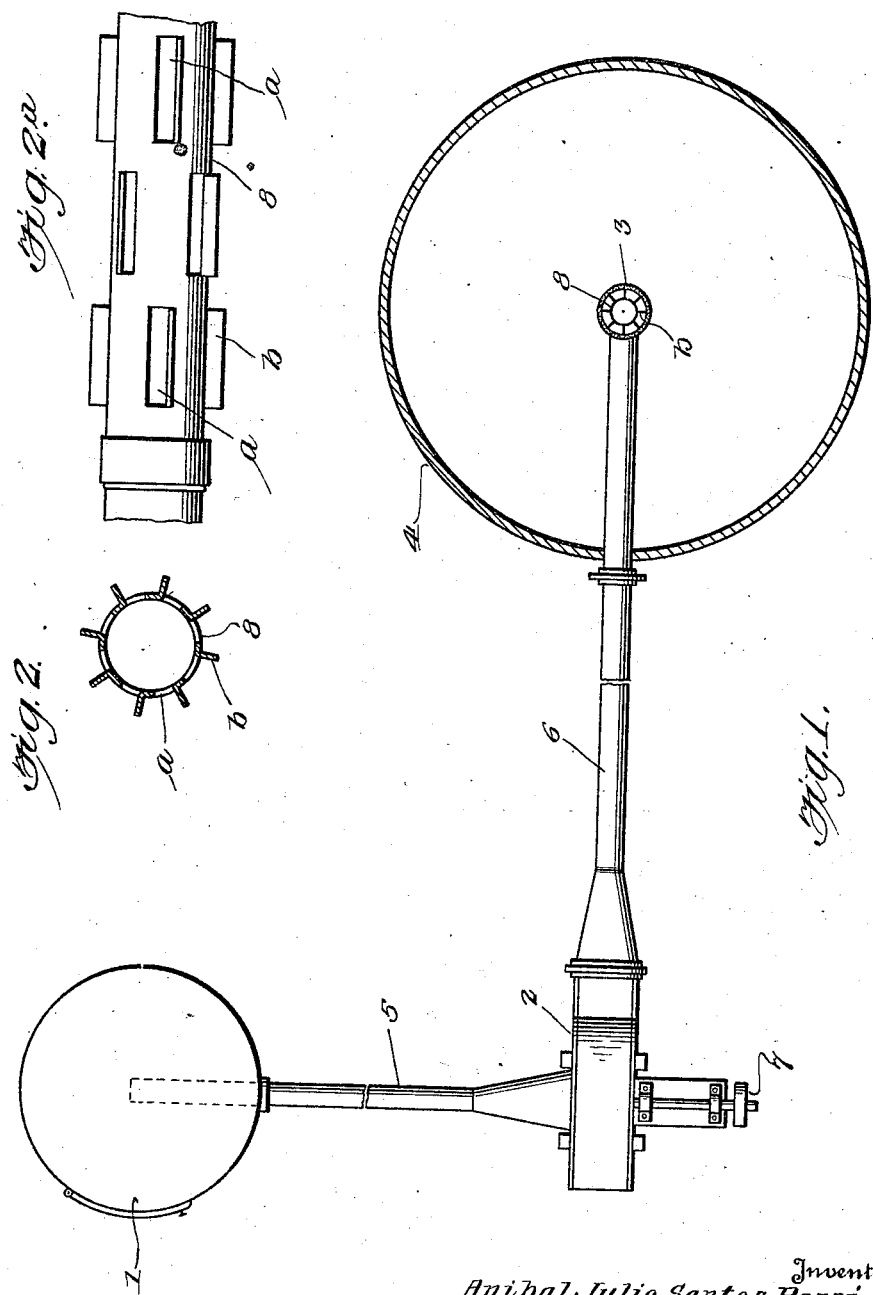

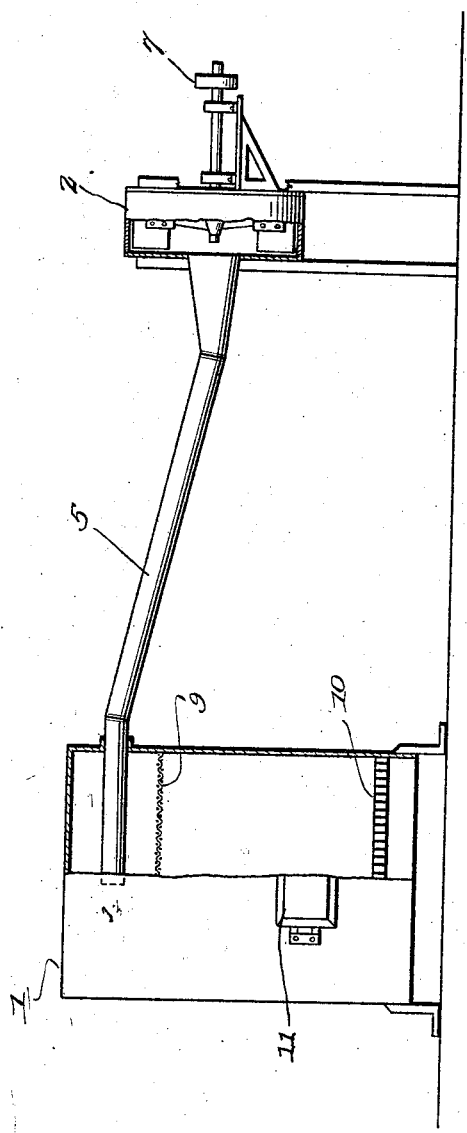

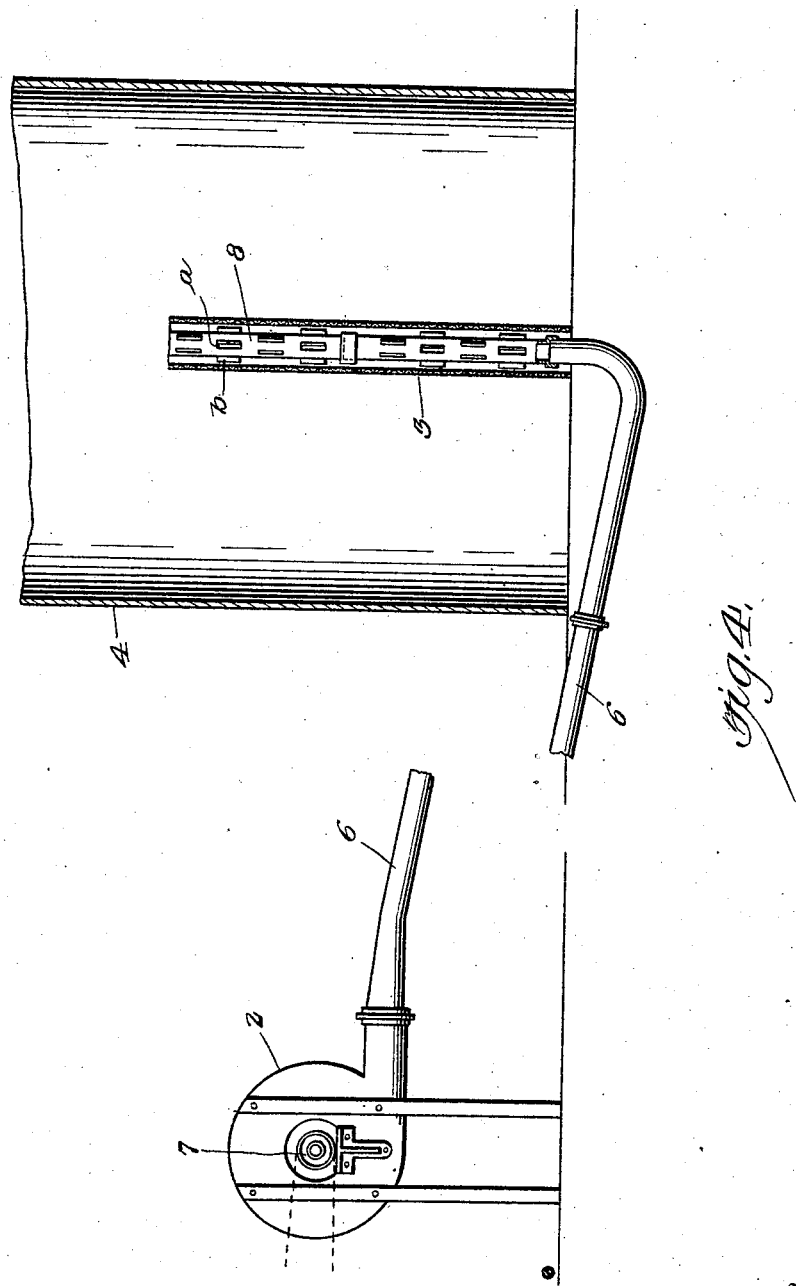

1,630,308

UNITED STATES PATENT OFFICE.

ANIBAL JULIO SANTOS PAZZI, LUIS JOSE DOMINGO PAZZI, AND ADOLFO PEREZ ORDOÑEZ, OF BUENOS AIRES, ARGENTINA.

APPARATUS FOR DRYING, CURING, VENTILATING, OR OTHERWISE TREATING GRAIN OR THE LIKE.

Application filed December 10, 1926, Serial No. 153,983, and in Argentina September 25, 1926.

This invention relates to an improved mechanical device for injecting currents of hot or cold air or of disinfecting or curing fumes or gases into corn silos and other similar storing containers, for drying, ventilating or disinfecting the corn cobs or other grain or products contained therein.

In order to facilitate the clear understanding of our invention and the manner of carrying the same into practice, we shall now proceed to describe the same with reference to the accompanying drawings which represent, by way of example, a preferred form of construction and arrangement of the apparatus according to our invention. In said drawings:

Figure 1 is an upper plan view of a complete drying or disinfecting plant applied to a silo for storing corn in cobs.

Figure 2 is a sectional view of the pipe for distributing the hot air or other fluid in the interior of the silo or store.

Fig. 2$^a$ is a fragmentary side elevation of the distributing pipe.

Figure 3 is a detail view of the arrangement of part of the plant, and

Figure 4 illustrates the remainder of the same.

Similar numbers of reference have been used to indicate like or corresponding parts in all the views.

In said drawings 1 indicates a stove of any suitable or approved construction, for heating the air or other fluid to be used for treatment. 2 is a ventilator, 3 indicates a protecting cover of wire gauze for the outlet openings of the distribution pipe; 4 is the silo and 5 the suction pipe for the fluid. 6 indicates the fluid feeding pipe, 7 is a pulley for driving the ventilator; 8 is the duct for distributing the fluid for treatment of grain within the silo. 9 is a filter for the hot air and 10 is the grate of the fire box. The reference letter $a$ indicates a series of openings provided in the distributing duct and $b$ are suitable flanges for supporting the protecting fabric or gauze 3.

The manner of operating the device in accordance with our invention, is as follows: When it is desired, for instance, to dry the contents of a corn silo or the like, the stove is charged with a suitable amount of glowing charcoal and feeding of such fuel is continued during the time and in the proportion required by the particular degree of moisture of the grain or other product to be treated.

Thereupon, the ventilator is started so as to draw the hot air through the filter of the stove, indicated in 9, and the suction pipe 5, whereupon said air, after passing through the ventilator is led by means of the feed duct 6 to the distribution pipe 8, whence it will pass into the mass of corn cobs or other product contained in the silo.

When the contents of the silo or store are to be cured or disinfected, a suitable curing or disinfecting material is added or applied to the coal fire in the stove, so that the gases or vapours thus generated will pass to the silo together with the hot air.

When it is desired to simply ventilate or aerate the contents of the silo our means of natural or cold air currents, the ventilator is disconnected from the suction pipe leading to the stove and air is directly drawn from the atmosphere.

For driving the ventilator, any suitable source of power may be used, such as obtained by applying a pulley to the drive wheel of a motor car, or in any other convenient or known manner; it will also be evident that the ventilator may be driven by hand, if desired, and in case of small amounts of corn or the like having to be submitted to a short treatment.

The experiments which we have carried on, showed that in a silo containing corn cobs of, say 17.30% of moisture, after treating the same with the apparatus above described and using the motive power derived from the wheel of an ordinary, small motor car, said contents of moisture were readily and speedily reduced to 14.70% at a small cost of labor and fuel.

The silos or other stores to which the above drying or disinfecting method is to be applied, must previously be provided with the feed pipe above referred to, which preferably extends from a point at the periphery of the bottom of the silo towards the centre of the same, where it is connected to the fluid distributing pipe which rises through the middle part of said silo.

In connection with silos or stores of small dimensions, it will be sufficient to provide a suitable number of sections, in accordance with its height. For silos or storing containers of a diameter and height exceeding four meters, two or more double branch pipes should alternately be inserted extending in opposite directions, and with one or more sections for each branch.

For silos or storing containers of rectangular shape of a length to twice its width or more, a number of distributing ducts should be provided in proportion to their length.

We desire it to be understood that modifications of construction and detail may be introduced in the device according to this invention, without departing from the general scope thereof as set forth in the following claim.

We claim:

Apparatus for drying or otherwise treating grain or the like, comprising means for forcing a fluid into the grain, a fluid-distributing pipe connected with said means and adapted to extend through the grain, said pipe having elongated perforations in its walls, outwardly extending projections integral with the pipe, which projections are coextensive with and disposed beside the perforations, and a sheath of fabric surrounding the pipe throughout its length and spaced therefrom by the projections.

In testimony whereof we affix our signatures.

ANIBAL JULIO SANTOS PAZZI.
LUIS JOSE DOMINGO PAZZI.
ADOLFO PEREZ ORDOÑEZ.